United States Patent
Xia et al.

(10) Patent No.: US 9,754,210 B2
(45) Date of Patent: Sep. 5, 2017

(54) USER INTERESTS FACILITATED BY A KNOWLEDGE BASE

(71) Applicant: MICROSOFT CORPORATION, Redmond, WA (US)

(72) Inventors: Minghui Xia, Sammamish, WA (US); Evgeny Podlepaev, Seattle, WA (US); Qiaolin Mao, Kirkland, WA (US); Eric Conrad Ranft, Enumclaw, WA (US); Xiaodong Fan, Sammamish, WA (US); Ting Cai, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 136 days.

(21) Appl. No.: 14/242,576

(22) Filed: Apr. 1, 2014

(65) Prior Publication Data
US 2015/0278691 A1    Oct. 1, 2015

(51) Int. Cl.
*G06F 17/30*      (2006.01)
*G06N 5/04*       (2006.01)
*G06Q 30/02*      (2012.01)

(52) U.S. Cl.
CPC ......... *G06N 5/04* (2013.01); *G06F 17/30864* (2013.01); *G06F 17/30985* (2013.01); *G06Q 30/02* (2013.01); *G06F 17/30699* (2013.01)

(58) Field of Classification Search
None
See application file for complete search history.

(56) References Cited

U.S. PATENT DOCUMENTS 8,473,500 B2    6/2013  Baluja et al.
8,533,188 B2    9/2013  Yan et al.
(Continued)

FOREIGN PATENT DOCUMENTS

CN    103218407 A     7/2013
WO    2008134772 A1  11/2008

OTHER PUBLICATIONS

Dudev, et al., "Personalizing the Search for Knowledge," In Proceedings of 2nd International Workshop on Personalized Access, Profile Management, and Context Awareness: Databases, Aug. 23, 2008, 8 pages.
(Continued)

*Primary Examiner* — Hung Q Pham
(74) *Attorney, Agent, or Firm* — Shook, Hardy & Bacon, LLP

(57) ABSTRACT

In one implementation, a computer-implemented method for determining user interests includes receiving user activity data that describes an interaction between a user and digital content. The method further includes generating first interest-level data that quantifies a first level of interest between the user and an entity that is a topic of the digital content, where the entity is of a plurality of entities included within a knowledge base. The knowledge base includes an ontology that indicates relationships between the plurality of entities. The method further includes identifying a candidate entity based on the candidate entity having one of the relationships to the entity within the knowledge base. Additionally, the method includes generating second interest-level data that quantifies a second level of interest between the user and the candidate entity based on an analysis of the one of the relationships of the candidate entity to the entity within the knowledge base.

20 Claims, 6 Drawing Sheets

(56) References Cited

U.S. PATENT DOCUMENTS

| | | | |
|---|---|---|---|
| 2008/0243833 A1* | 10/2008 | Wang | G06F 17/30731 |
| 2008/0294628 A1* | 11/2008 | Shoval | G06F 17/30702 |
| 2010/0250341 A1 | 9/2010 | Hauser | |
| 2012/0158738 A1 | 6/2012 | Buehrer et al. | |
| 2012/0290599 A1* | 11/2012 | Tian | G06Q 30/02 707/758 |
| 2014/0012842 A1 | 1/2014 | Yan et al. | |
| 2015/0242512 A1* | 8/2015 | Lindahl | G06F 17/30867 707/723 |

OTHER PUBLICATIONS

Carney, Michael, "Know Thy User! GraphDive Distills Inferred Demographic and Interest Graph Data from Social Feeds," published Oct. 4, 2012; http://pando.com/2012/10/04/know-thy-user-graphdive-distills-inferred-demographic-and-interest-graph-data-from-social-feeds/; 15 pages.
Passant, Alexandre, "Knowledge graphs utilised for content personalization and discovery on the Web," published Nov. 3, 2013; http://blog.seevl.fm/2013/11/03/knowledge-graphs-for-discovery/: 7 pages.
Krishnan, et al., "Graph based User Interest Modeling in Twitter CS224W : Final Project , Group 41," retrieved Mar. 5, 2014; http://www.stanford.edu/class/cs224w/projects2013/cs224w-041-final.pdf; 7 pages.
So, et al., "Extending Open Directory Project to Represent User Interests," In Proceedings of the 27th Annual ACM Symposium on Applied Computing, Mar. 25, 2012, pp. 354-359.
Shen, et al., "Linking Named Entities in Tweets with Knowledge Base via User Interest Modeling," In Proceedings of the 19th ACM SIGKDD International Conference on Knowledge Discovery and Data Mining, Aug. 11, 2013, pp. 68-76.
Wen, et al., "Improving User Interest Inference from Social Neighbors," In Proceedings of the 20th ACM International Conference on Information and Knowledge Management, Oct. 24, 2011, 6 pages.
Hakkani-Tur, et al., "Using a Knowledge Graph and Query Click Logs for Unsupervised Learning of Relation Detection," In Proceedings of IEEE International Conference on Acoustics, Speech and Signal Processing, May 26, 2013, pp. 8327-8331.
Sieg, et al., "Learning Ontology-Based User Profiles: A Semantic Approach to Personalized Web Search," In Proceedings of IEEE Intelligent Informatics Bulletin, vol. 8, No. 1, Nov. 2007, pp. 1-12.
"Project: User Targeting," retrieved Mar. 5, 2014; http://labs.yahoo.com/project/user-targeting/; 1 page.
Bouneffouf, Djallel, "Situation-Aware Approach to Improve Context-based Recommender System," In Proceedings of CoRR, Mar. 2013, 5 pages.
Cena, et al., "Propagating user interests in ontology-based user model," In Proceedings of the 12th International Conference on Artificial Intelligence around Man and Beyond, Sep. 15, 2011, 12 pages.
"Open Direct Project," retrieved Mar. 6, 2014; http://www.dmoz.orgt; 1 page.
"Category Targeting," retrieved Mar. 6, 2014; http://advertising.microsoft.com/en-us/category-targeting; 1 page.
"International Search Report and Written Opinion Issued in PCT Patent Application No. PCT/US2015/023227", Mailed Date: Jun. 24, 2015, 11 Pages.
"Second Written Opinion Issued in PCT Application No. PCT/US2015/023227", Mailed Date: Feb. 10, 2016, 8 Pages.
"International Preliminary Report on Patentability Issued in PCT Application No. PCT/US2015/023227", Mailed Date: May 6, 2016, 9 Pages.

* cited by examiner

USER INTERESTS FACILITATED BY A KNOWLEDGE BASE

BACKGROUND

As computing systems have become ubiquitous in society, digital content has proliferated. With the large quantities of digital content now available, it has become increasingly important to identify and present digital content that is relevant to a user. For example, the user may enter a search query into a search engine to locate relevant websites or other digital content. The search engine can analyze large volumes of digital content in order to identify the relevant digital content. In doing so, the search engine may evaluate the search query to determine the user's intent so as to provide relevant search results.

SUMMARY

The present disclosure is directed, in part, to determining user interests facilitated by a knowledge base, substantially as shown in and/or described in connection with at least one of the figures, and as set forth more completely in the claims. In accordance with implementations of the present disclosure, user interests can be determined, discovered, and updated as facilitated by a knowledge base. User activity may be processed in order to determine which digital content a user has interacted with. Digital content that the user has interacted with can be evaluated in order to determine topics of the digital content. The topics may be selected from entities of a knowledge base and may be mapped to the digital content.

By analyzing the topics using the knowledge base, inferences can be made as to interests of the user. For example, relationships between topics can be analyzed to discover new interests of the user or to reevaluate quantifiers of existing levels of interest. Thus, new related interests can be discovered from the digital content that might otherwise have gone undiscovered. Furthermore, the user interests can be updated over time as more information is available about the user or user interests change. Thus, the knowledge base allows for deep understanding of digital content that a user has interacted with. Also, additional digital content that is presented to the user can be customized to the user interests using the knowledge base.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present disclosure is directed, in part, to determining user interests facilitated by a knowledge base, substantially as shown in and/or described in connection with at least one of the figures, and as set forth more completely in the claims. In accordance with implementations of the present disclosure, user interests can be determined, discovered, and updated as facilitated by a knowledge base. User activity may be processed in order to determine which digital content a user has interacted with. Digital content that the user has interacted with can be evaluated in order to determine topics of the digital content. The topics may be selected from entities of a knowledge base and may be mapped to the digital content.

By analyzing the topics using the knowledge base, inferences can be made as to interests of the user. For example, relationships between topics can be analyzed to discover new interests of the user or to reevaluate quantifiers of existing levels of interest. Thus, new related interests can be discovered from the digital content that might otherwise have gone undiscovered. Furthermore, the user interests can be updated over time as more information is available about the user or user interests change. Thus, the knowledge base allows for deep understanding of digital content that a user has interacted with. Also, additional digital content that is presented to the user can be customized to the user interests using the knowledge base.

Figure 1:
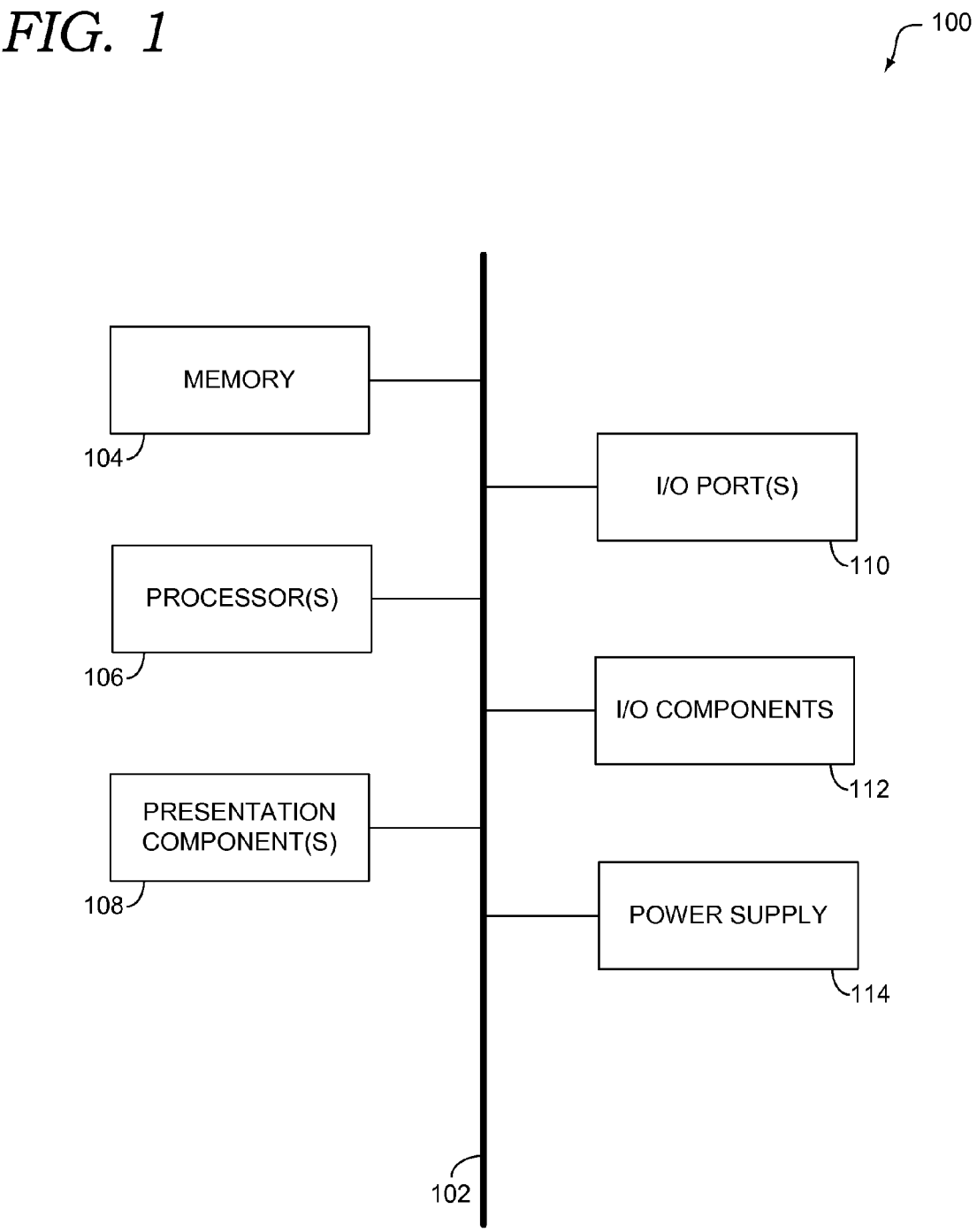
FIG. 1 is a block diagram of an exemplary computing environment suitable for use in implementations of the present disclosure.

FIG. 1 is a block diagram of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Figure 2:
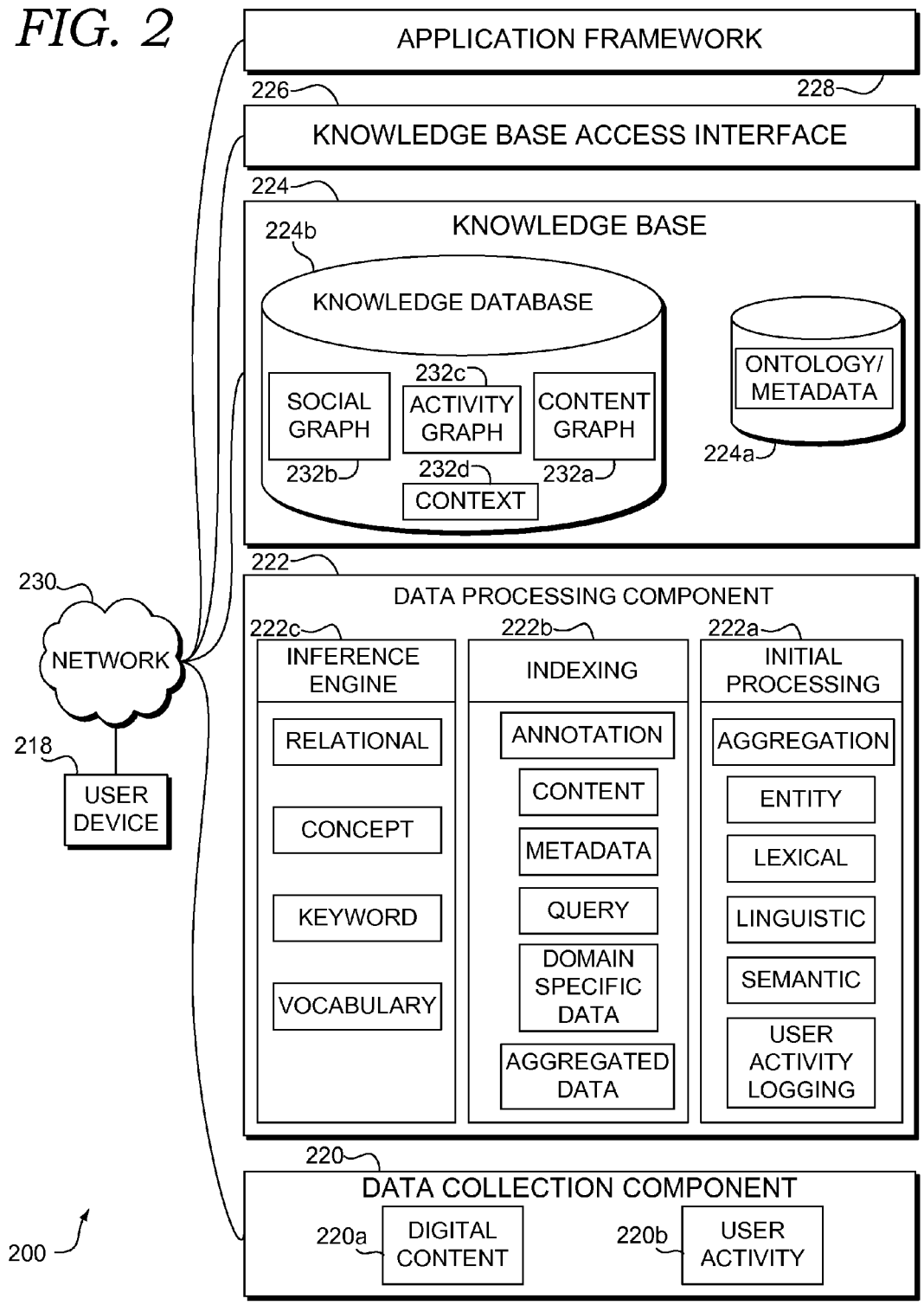
FIG. 2 illustrates an exemplary system for determining user interests in accordance with implementations of the present disclosure.

Referring now to FIG. 2, a depiction of an exemplary system in accordance with implementations of the present disclosure is provided. In particular, FIG. 2 illustrates system 200, which is suitable for determining user interests facilitated by a knowledge base, in accordance with implementations of the present disclosure. System 200 includes user device 218, data collection component 220, data processing component 222, knowledge base 224, knowledge base access interface 226, and application framework 228, all capable of communication with one another, for example, through a network 230.

Network 230 may be wired, wireless, or both. Network 230 may include multiple networks, or a network of networks, but is shown in FIG. 2 in simple form so as not to obscure other aspects of the present disclosure. By way of example, network 230 can include one or more wide area networks (WANs), one or more local area networks (LANs), one or more public networks, such as the Internet, and/or one or more private networks. Where network 230 includes a wireless telecommunications network, components such as a base station, a communications tower, or even access points (as well as other components) may provide wireless connectivity. Although single components are illustrated for the sake of clarity, network 230 may enable communication between any number of devices, which can include user device 218. Networking environments are commonplace in offices, enterprise-wide computer networks, intranets, and the Internet. Accordingly, network 230 is not described in significant detail.

In various implementations, user device 218 is any computing device that is capable of accessing the Internet, such as the World Wide Web, for instance, computing device 100 of FIG. 1. As such, user device 218 might take on a variety of forms, such as a personal computer (PC), a laptop computer, a mobile phone, a tablet computer, a wearable computer, a personal digital assistant (PDA), a server, a CD player, an MP3 player, a global positioning system (GPS) device, a video player, a handheld communications device, a workstation, any combination of these delineated devices, or any other device that is capable of web accessibility. In some implementation, user device 218 is a mobile device that utilizes a wireless telecommunications network to communicate over network 230.

Data collection component 220, data processing component 222, knowledge base 224, knowledge base access interface 226, and application framework 228 (also referred to herein as "components 220, 222, 224, 226, and 228") may reside in association with one or more computing devices, e.g., a server or collection of servers. Any or all of the one or more computing devices can be implemented in accordance with computing device 100 of FIG. 1. Although components 220, 222, 224, 226, and 228 are illustrated as distinct components, one or more of components 220, 222, 224, 226, and 228 may, in fact, be combined or may itself be comprised of multiple components. System 200 is but one exemplary configuration and is not intended to be so limiting.

Data collection component 220 is configured to obtain data for system 200. The data can comprise any combination of unstructured data, structured data, and semi-structured data. Unstructured data may comprise documents possessing a series of text lines. Documents that are included in the category of unstructured data may have little or no metadata. Structured data, on the other hand, may comprise a traditional database where information is structured and referenced. Semi-structured data may comprise a document such as a research paper or a Security and Exchange Commission filing, where part of the document comprises lines of text and part of the document comprises tables and graphs used for illustration. In the case of semi-structured data, the structured components of a document may be analyzed as structured data and the unstructured components of the documents may be analyzed as unstructured data.

Data collection component 220 can obtain the data in a number of ways, including through use of digital content feed 220a and user activity feed 220b, as indicated in FIG. 2. Digital content feed 220a provides system 200 with access to digital content. For example, indexing sub-component 222b can use digital content feed 220a to process the digital content into one or more indexes, such as index 574 of FIG. 5, which is later described in further detail. The one or more indexes may also be included in knowledge base 224. The digital content can take various forms, and may be incorporated into one or more documents or files, but need not be structured as such. Examples of the digital content include a webpage, a post on a social network, an email, a mobile text, an advertisement, a word processing document, a music file, a video file, an audio book, a spreadsheet, an electronic book, a news article, a blog post, a game, an application, and such.

Digital content feed 220a can source the digital content from a variety of data stores. In some implementations, the data stores provide digital content feed 220a with access to any digital content accessible over the Internet and/or an Intranet. In one implementation, the digital content comprises web documents, which are sourced to digital content feed 220a by pulling data from the crawling of the web documents. The digital content may be pushed into system 200. Data pushes may originate from one or more sources, such as structured data sources. In some implementations, the digital content is provided to system 200 periodically. For example, the digital content can be provided by a system operated by a company that offers digital content for sale, such as a digital media store.

Furthermore, one of the data stores that digital content feed 220a can source the digital content from could be a local device to user device 218, such as a hard drive. As another example, another data store could be cloud based storage associated with a user of user device 218, for example, by way of a user identifier and/or user account. However, it is contemplated that a user can grant or deny access to digital content in any data store that may risk compromising the privacy and anonymity of the user.

User activity feed 220b provides system 200 with access to user activity data. User activity data can comprise user history or can be user activity provided in real time as a stream. User activity feed 220b can be processed and/or analyzed by data processing component 222 so as to provide the user activity data to system 200. For example, user activity feed 220b can be tracked, logged, and aggregated by initial processing sub-component 222a so as to generate user history data.

The user activity data can describe an interaction between a user and digital content, such as any of the digital content accessible to digital content feed 220a. Examples of user activity feed 220b include any combination of user input, the number of times a user has viewed digital content, clicks, click streams, opening digital content, accessing digital content, viewing digital content, downloading digital content, purchasing digital content, annotating digital content, search queries, and/or other user behavior in a computing environment that associates the digital content to an interaction with the user. User privacy and anonymity is strictly enforced in handling the user activity data.

A specific example of user activity feed 220b includes the entering of a search query into a search engine. For example, the search engine can return documents in response to the search query, where the documents can correspond to the digital content of the user activity data. Another example of user activity feed 220b includes the marking a web document as a favorite or bookmark in a web browser, where the web document can correspond to the digital content of the user activity data. In some implementations, user activity feed 220b includes feedback from the user. For example, the feedback may confirm an entity of knowledge base 224 as an interest to the user. As one example, the feedback may be in response to a query, presented on user device 218 to confirm user interest, after being generated by data processing component 222. Additional examples of user activity feed 220b can include any other information that is input by a user on a user device 218.

Data received from one or more sources utilizing data collection component 220, such as those listed above, are analyzed by data processing component 222 to extract relevant information. That is, data processing component 222 is configured to analyze the data and extract information therefrom. In various implementations, once data is received by data collection component 220, the data may be processed by one or more data processing sub-components of data processing component 222. Data processing component 222 illustrated in FIG. 2 includes initial processing sub-component 222a, indexing sub-component 222b (e.g. a dimensional indexing sub-component), and inference engine 222c for processing the data.

In various implementations, initial processing sub-component 222a is configured to analyze the data from data collection component 220 and extract information from the data using one or more data processing methods. In this regard, initial processing sub-component 222a may be used to analyze the data and extract information from any of unstructured data, structured data, and semi-structured data.

In some implementations, initial processing of the data by initial processing sub-component 222a includes one or more of a lexical analysis, a linguistic analysis, a semantic analysis, and an entity extraction analysis of the data. At or after an the initial analysis, inferences may be made between aspects of the data received. As such, data from seemingly disparate sources may be integrated and new relationships may be inferred through the extraction of attributes, such as meaning and semantics, from the data. Inferences may be created through entity relationship extraction using documents or data being processed and data which is already stored in the knowledge base 224. In some implementations, the data is from digital content feed 220a and/or user activity feed 220b and the user activity data is generated based on the inferences.

In various implementations, inferences may be formed as data is loaded into system 200. Such inferences may be discerned between new information and information that is already stored in system 200, for instance, in association with knowledge base 224 (as more fully described below). Furthermore, data stored in system 200 may be analyzed for inferences when new entries have been entered into system 200, particularly when new entries are added to knowledge base 224 of system 200. As such, system 200 may be thought of as a learning system, which employs one or more machine learning algorithms. Once inferences have been made from the data, those inferences may be aggregated into a data store, such as knowledge database 224b of knowledge base 224.

Indexing sub-component 222b is configured to create one or more indexes, such as a multi-dimensional index or table. The one or more indexes can reference components of knowledge base 224, such as any of the various entities within knowledge base 224. The one or more indexes can also optionally reference digital content, such as digital content provided from digital content feed 220a. In some implementations, indexing sub-component 222b is also configured to abstract data based on relational schema and ontology and unify the data such that it may be exposed as a knowledge graph. The ontology may correspond to ontology/metadata component 224a of knowledge base 224, shown in FIG. 2. As such, indexing sub-component 222b may refer to the ontology stored in knowledge base 224.

Indexing sub-component 222b thus enables mapping of the data and the ontology. For example, the digital content can be mapped to entities of the ontology. Additionally, indexing sub-component 222b enables mapping of sub-areas such as metadata, content, annotation, query, domain-specific data and aggregated data. Entities of knowledge database 224b mapped using indexing sub-component 222b include instance entities and concept entities. It is noted that the present disclosure is not limited to a particular ontology.

Inference engine 222c is configured to make second degree inferences by analyzing inferences that may exist between data that is added to knowledge base 224 and inferences that have been stored in knowledge base 224 of system 200. As such, one aspect of inference engine 222c may be to analyze knowledge base 224 to search for new inferences that may be made when data is added to knowledge base 224. Also, inference engine 222c may search for new inferences in response to the receipt of an information request made to knowledge base 224 using knowledge base access interface 226.

Exemplary knowledge base 224 includes ontology/metadata component 224a and knowledge database 224b. Though illustrated as a single database, knowledge database 224b may, in fact, be a collection of one or more databases, one or more of which may be stored in association with a server (not shown), network (not shown), other system components (e.g., user device 218), or other computing devices (not shown). The content of ontology/metadata component 224a and knowledge database 224b can be stored in various manners including online or offline and can be in a distributed file system or cloud, as examples. It is therefore noted that the content need not be stored in a database.

Exemplary knowledge database 224b includes at least one graph, such as content graph 232a, social graph 232b, and user activity graph 232c, as well as contextual data 232d as it relates to all or some of the graphs in knowledge database 224b. In some implementations, content graph 232a, social graph 232b, and/or user activity graph 232c are incorporated into a single composite graph. The graphs used in system 200 can be constructed based on a flexible, extensible data storage schema, for instance, a star or snowflake schema. The star or snowflake schema can be used to govern connections or relationships between entities within knowledge base 224. Furthermore, the graphs used in system 200 may be constructed utilizing other data storage schema, which can be customized based on need.

Ontology/metadata component 224a of knowledge base 224 may serve as an ontology- and metadata-based index where entities may be extracted from at least one graph of knowledge database 224b, such as content graph 232a, social graph 232b, and user activity graph 232c. Ontology/metadata component 224a is, for example, enabled through indexing sub-component 222b, and is modified, for example, through inference engine 222c.

Ontology/metadata component 224a can be utilized to reference data from each graph of knowledge database 224b using a common referencing schema. The common referencing schema may be in the form of the aforementioned star schema. Through the use of a star schema, a set of data may be stored in a data table. From this initial data table, additional data may be referenced by snow flaking into other tables. Use of the common referencing schema allows an effective means for entities to reference disparate aspects of data collected for knowledge database 224b and stored in different graphs.

Entities included within knowledge base 224 may be, for example, concept entities, which can represent concepts, sets of entities, types of entities, kinds of entities, and/or collections of entities that may be a topic of digital content, such as a web document. Entities included within knowledge base 224 may also be, for example, instance entities, which can represent individuals of one or more concept entities, such as a person, a place, an event, or a thing. Instance entities can be "ground level" entities of an ontology embodied by ontology/metadata component 224a. Examples of instance entities include a particular character in a play (e.g. "Romeo"), a particular mathematical theorem (e.g. "Pythagorean Theorem"), or a particular geographical location (e.g. "Alexandria). Examples of corresponding concept entities may then include "Characters of Shakespeare", "Mathematical Theorems," and "Cities in Virginia."

In some implementations, each entity in knowledge base 224 comprises at least one attribute. An attribute comprises data associated with the entity, such as a characteristic or a fact. For example, attributes associated with a concept entity could include a common definition of a concept represented by the concept entity, the number of people who have searched for the concept using a search engine, and names of writers who have written on the concept. Exemplary attributes associated with an instance entity that represents a character in a play include a particular character's love interest, a geographical origin of the character, the author of the play, and generally agreed upon traits of the character. Exemplary attributes associated with an instance entity that represents a mathematical theorem include the name of a person(s) who discovered the theorem, the date the mathematical theorem was discovered, and historical facts relating to the development and/or acceptance of the mathematical theorem. Exemplary attributes associated with an instance entity that represents a geographic location include a history of the geographic location, language(s) commonly spoken in the geographic location, and longitudinal and latitudinal reference points of the geographic location.

In various implementations, social graph 232b of knowledge database 224b includes entities associated with data relating to a user profile(s), user relationships with other users, and user preferences. Social graph 232b can also include user profile information associated with participants of a social network. For example, social graph 232b may include all "friend" listings in an area, or it may include information relating to which users are friends of a user's friends ("friend of a friend" data). Data associated with users on a social networking website may include user demographic information, user psychographic information and user behavioral data. Examples of user behavioral data include follows and likes of posts on a social network.

User activity graph 232c may be constructed from information associated with user activity, for instance, the activity of registered users. In some implementations, a user may be verified as being a registered user through the use of a security measure, such as a password or another form of authenticating the identity of the user, such as through the originating address of a user device (e.g., user device 218). User activity may include, by way of example only, any of the various user activities indicated by user activity feed 220b.

Content graph 232a of knowledge database 224b may include one or more attributes of entities, attributes comprising keywords, metadata, meanings, associations, properties, content, query, query results, annotations, and semantified data entities. Entities in content graph 232a may comprise information about digital content, as well as digital content itself. Data collection component 220 and data processing component 222 can analyze this information and store it in system 200, for instance, in association with knowledge base 224.

Knowledge database 224b may further include an annotation component (not shown) having an ontology/metadata management component configured for managing metadata annotation. Knowledge database 224b may also include a semantified data component (not shown) configured for storing semantified data in relational tables or in graph tables. Semantified data may be managed by indexing subcomponent 222b and/or other relational database managers (not shown).

Contextual data 232d of knowledge database 224b may include various types of data suitable for contextualizing the content of knowledge database 224b, including user activity. Examples include temporal data, location data, user device data, and/or other data which can be utilized for context. Temporal data can comprise information related to the temporal nature (that is, of or related to time) of data included in graphs or other data obtained utilizing digital content feed 220a and/or user activity feed 220b. Also, a time index may comprise an aggregation of time elements of contextual data 232d. For instance, a time element may track user activity over a period of time, such as the past 30 days, or may indicate a specific time a user interacted with digital content. Contextual data 232d may be utilized by inference engine 222c to make inferences about user's interests at different periods during a day, week, or year.

Location data can comprise information related to the location of the user and/or user device 218. For example, location data may include geographical information and may be provided by a GPS integrated into user device 218. In some implementations, location data is be extracted from digital content the user has interacted with. For example, the location data may be extracted from text of the digital content. The digital content may comprise a digital photo having embedded geographical data. As another example, location data may be determined by analyzing the digital content. For example, a location of the digital photo may be determined from image analysis or for a digital book may be determined by text based analysis.

User device data can comprise device information of user device 218. For example, user device data can indicate any of various states or capabilities of user device 218. A few examples include a model number of user device 218, available or used storage space of user device 218, available or used random-accesses memory (RAM) of user device 218, a version of type of operating system running on user device 218, information related to quantities, amounts, and or types of digital content accessible by user device 218, information indicating the presence and/or type of any digital cameras accessible by user device 218, display information including available resolutions and display quantities, and many others.

Knowledge base access interface 226 of system 200 allows one or more applications to access components of knowledge base 224. The one or more applications can be hosted on application framework 228 so as to interact with knowledge base 224 through knowledge base access interface 226. Application framework 228 may allow the one or more applications to access and query knowledge base 224 by submitting information requests that are processed by data processing component 222. Additionally, APIs may be used to allow developers to write applications that utilize knowledge base 224. Some of the one or more applications may be running, at least partially, on user device 218. Others may be running external to user device 218.

In accordance with implementations of the present disclosure, system 200 allows for user activity to be processed in order to determine which digital content a user has interacted with. Digital content that the user has interacted with can then be evaluated in order to determine topics of the digital content. The topics are selected from entities of knowledge base 224 and are mapped to the digital content. By analyzing the topics using the knowledge base, inferences can be made as to interests of the user. For example, relationships between topics can be analyzed to discover new interests of the user or to reevaluate quantifiers of existing levels of interest.

Figure 3:
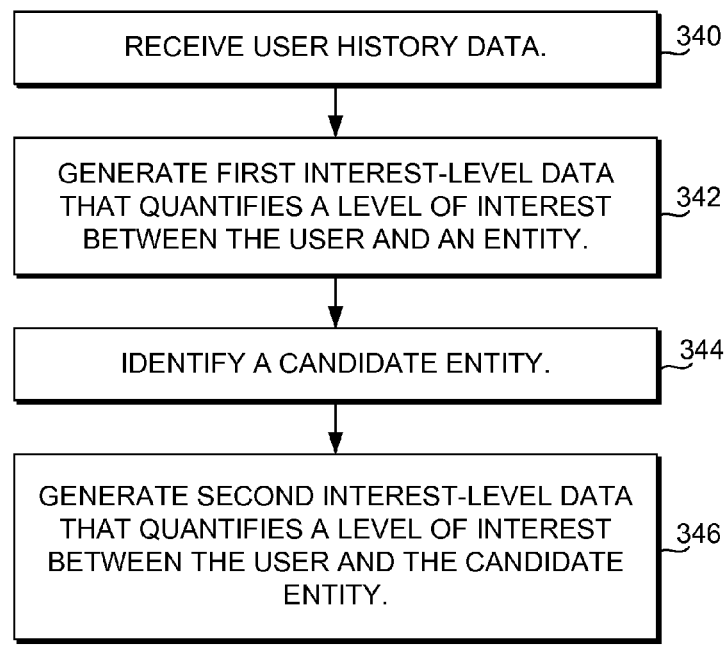
FIG. 3 depicts a flow diagram of an exemplary method for determining user interests in accordance with implementations of the present disclosure.
Figure 5:
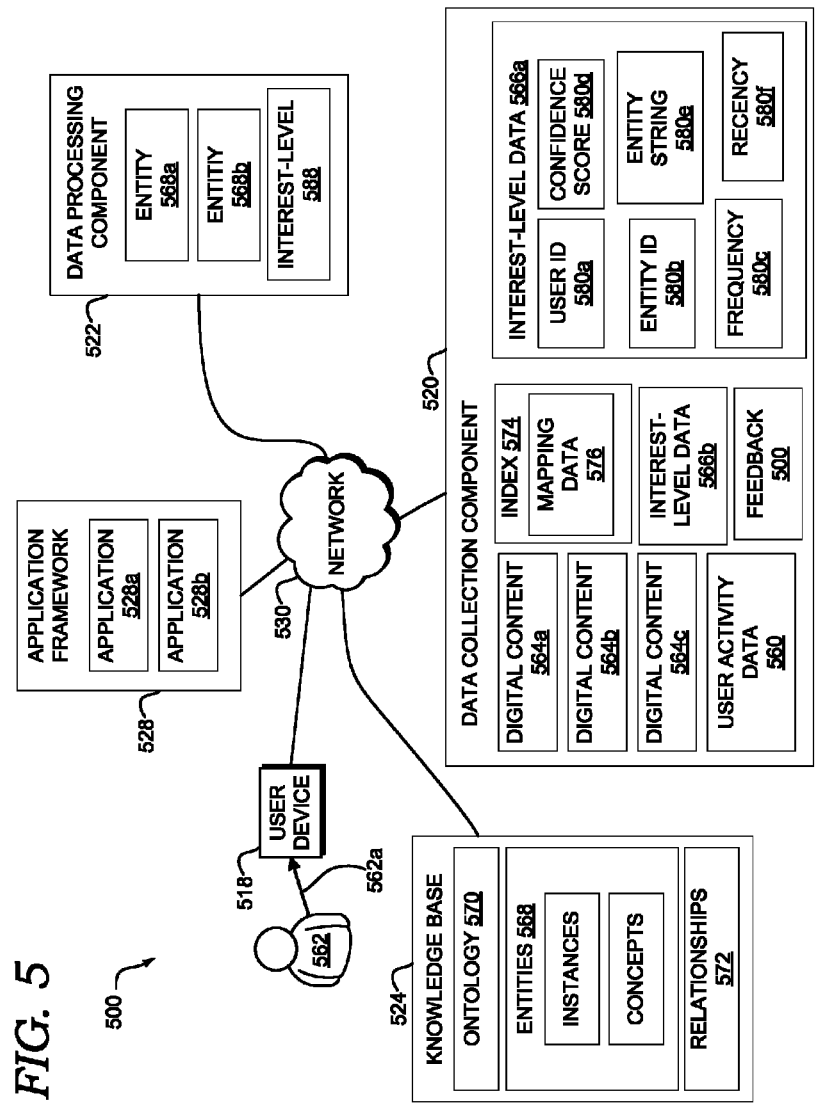
FIG. 5 illustrates an exemplary system in accordance with implementations of the present disclosure.

Referring now to FIG. 3, a flow diagram of an exemplary method is provided, in accordance with implementations of the present disclosure. In particular, FIG. 3 depicts a flow diagram of method 300, in accordance with implementations of the present disclosure. Method 300 is described below with respect to FIG. 5 and FIG. 6, for illustrative purposes only. FIG. 5 illustrates an exemplary system in accordance with implementations of the present disclosure. In particular, FIG. 5 illustrates system 500, which corresponds to system 200 in FIG. 2. Thus, system 500 includes user device 518, data collection component 520, data processing component 522, knowledge base 524, application framework 528, and network 530 corresponding respectively to user device 218, data collection component 220, data processing component 222, knowledge base 224, application framework 228, and network 230 in system 200. It is noted that FIG. 5 is not intended to capture specific timing related to relative locations of data, but is instead intended to illustrate aspects related to the handling of the data and the types of data available to system 500.

Method 300 includes receiving user activity data that describes an interaction between a user and digital content (340 in FIG. 3). For example, as indicated by FIG. 5, user activity data 560 is received and describes an interaction between user 562 and digital content 564A.

User activity data 560 can be received by data processing component 522 from data collection component 520. User activity data 560 can correspond to the user activity data described above with respect to FIG. 2. Thus, user activity data 560 may have been generated by data processing component 522 by processing and/or analyzing user activity feed 220b, of FIG. 2.

As one example, user 562 may provide user input 562a to application 528a, which is hosted on application framework 528, through user device 518. Application 528a may be a web browser, an operating system, a media store, a word processor, a mobile operating system, an operating system extension, a game, an eBook reader, or other application than can receive user input 562a to processes user interactions between user 562 and digital content 564a. Any of those interactions can be incorporated into user activity data 560.

In some implementations, user activity data 560 is generated from user activity feed 220b utilizing knowledge base 524. For example, data processing component 522 can process and analyze user activity feed 220b utilizing user activity graph 232c, optionally in conjunction with contextual data 232d. However, in other implementations, data processing component 522 can generate user activity data 560 without utilizing knowledge base 224. In other words, the present disclosure is not limited to graph based approaches to generating user activity data 560.

Interaction between user 562 and digital content 564A may be described in user activity data 560, for example, utilizing content from user activity graph 232c and/or contextual data 232d, such as any combination of instance and/or concept entities contained therein, in association with a user identifier (ID) and/or a digital content ID, by way of example.

Method 300 further includes generating first interest-level data that quantifies a level of interest between the user and an entity that is a topic of the digital content, where the entity is of a plurality of entities included within a knowledge base, the knowledge base comprising an ontology that indicates relationships between the plurality of entities (342 in FIG. 3). For example, as indicated by FIG. 5, interest-level data 566a is generated and quantifies a level of interest between user 562 and entity 568a that is a topic of digital content 564a. Entity 568a is of entities 568 included within knowledge base 524, where knowledge base 524 comprises ontology 570 that indicates relationships 572 between entities 568.

Digital content 564a can be identified in user activity data 560, for example, by way of the digital content ID in user activity data 560. Data processing component 222 may then determine that entity 568a, and potentially other entities, is a topic of digital content 564a. Data processing component 222 may next generate interest-level data for entity 568a and any other entities that are determined as topics of digital content 564a.

In some implementations, entity 568a and/or the other entities are determined as topics of digital content 564a by analyzing digital content 564a from digital content feed 220a of FIG. 2 and generating the entities from digital content 564a on the fly. Entity 568a and/or the other entities can also be pregenerated and can be determined as topics of digital content 564a by identifying the entities as being matched to digital content 564a by mapping data. For example, entity 568a can be matched to digital content 564a by mapping data 576. Mapping data 576 can be of a plurality of mapping data, which can be in index 574. The plurality of mapping data can be matching any or all of entities 568 included within knowledge base 524 to corresponding digital content (which includes digital content 564a).

Initial processing sub-component 222a can utilize inferences to generate topics of digital content through entity relationship extraction based on digital content 564a and data which is already stored in the knowledge base 224. In exemplary implementations, inferences are generated based on analyzing digital content 564a. For example, semantic understanding algorithms can be employed, which compare the similarity of digital content 564a with known content associated with entities 568 in knowledge base 524. As one example, words contained in digital content 564a may be compared for similarity to words contained in the known content associated with entities 568. The known content associated with entities 568 may have been extracted by system 200 from digital content that was utilized in incorporating entities 568 into knowledge base 524, or may have been provided otherwise.

A similarity score can be generated that quantifies the similarity between the known content associated with any of entities 568 and digital content 564a utilizing the semantic understanding algorithms. In this way, ones of entities 568, including entity 568a, can be determined as topics of digital content 564a based on, for example, similarity scores exceeding a predetermined threshold value. As another example, a certain number of entities 568, including entity 568a can be determined as topics of digital content 564a based on having the highest similarity scores of entities 568 (e.g. the top ten entities could be determined as topics of entity 568a). It will be appreciated that many other approaches can be employed in determining topics of digital content 564a. As indicated above, in various implementation, topics are generated prior to receiving user activity data 560 (e.g., by storing the mapping data associated with the pregenerated entities in index 574) and in other implementations, topics are generated after and/or in response to receiving user activity data 560.

Data processing component 222 may generate interest-level data for entity 568a and any other entities that are determined as topics of digital content 564a, for example, by storing data, which indicates a level of interest between user 562 and the entities. The interest-level data may be stored on user device 518 or externally, for example, in the cloud. Examples of the interest-level data are shown with respect to interest-level data 566a in FIG. 5.

As shown, interest-level data 566a includes entity ID 580b, which can be utilized by system 500 to identify entity 568a in knowledge base 524. Interest-level data 566a also includes user ID 580a. User ID 580a can correspond to user 562, and may be utilized by system 500 to identify a user account of user 562 from a plurality of other user accounts. User ID 580a can be linked to entity ID 580b in interest-level data 566a thereby indicating interest between user 562 and entity 568a. Thus, in some implementations, interest-level data may be considered a user interest profile, which tracks interest-level data between various entities and a user.

Also shown in FIG. 5, the interest-level data can include an entity string, such as entity string 580e. Entity string 580e comprises a string of characters corresponding to the entity being represented by entity 568a in knowledge base 524. For example, where entity 568a represents the character Romeo in Shakespeare's Romeo and Juliet, the string of character may be "Romeo." Entity string 580e may instead be derived from knowledge base 524 as needed.

Also shown in FIG. 5, the interest-level data can include a confidence score, such as confidence score 580d. Confidence score 580d can be a value that represents the level of interest between user 562 and entity 568a. In some implementations, in generating interest-level data, the similarity score described above with respect to entity 568*a* can be stored as confidence score 580*d*. However, confidence score 580*d* can otherwise be calculated by data processing component 522 or can be assigned a default value.

The interest-level data can also include frequency data, such as frequency data 580*c*. Frequency data 580*c* can indicate how often or a number of times entity 568*a* has been a topic of various digital content that user 562 has interacted with, for example, as described in various user activity data. In initially generating interest-level data 566*a*, the number of times entity 568*a* has appeared as a topic in the digital content can be one time. However, frequency data 580*c* can be updated as entity 568*a* appears in additional digital content over time. For example, at some point, user 562 may interact with digital content 564*b* or 564*c*, where entity 568*a* has been determined as a topic of thereof. Thus, after the user interacts with digital content 564*b* or 564*c*, data processing component 522 can update frequency data 580*c*. In this way, the level of interest between user 562 and entity 568*a* that is a topic of digital content 564*a* can be updated based on a frequency of entity 568*a* being a topic of digital content. As the frequency of entity 568*a* increases, so can the level of interest between user 562 and entity 568*a*.

FIG. 5 also shows that the interest-level data can include recency data, such as recency data 580*f*. Recency data 580*f* can indicate how recently, or at what time entity 568*a* has appeared as a topic in digital content that user 562 has interacted with, for example, as described in user activity data. The digital content includes digital content 564*a*. Recency data 580*f* may only relate to the most recent time entity 568*a* has appeared as a topic in digital content that user 562 has interacted with. In other implementations, recency data 580*f* may include an entry for each time entity 568*a* has appeared as a topic in digital content that user 562 has interacted with. It will be appreciated that in this implementation, frequency data 580*c* can be incorporated into recency data 580*f*. For example, the number of entries in recency data 580*f* may correspond to frequency data 580*c*. Each entry can be, for example, a time stamp. In this way, the level of interest between user 562 and entity 568*a* that is a topic of digital content 564*a* can be updated based on a recency of entity 568*a* being a topic of digital content.

In various implementations, frequency data 580*c* and/or recency data 580*f* can be utilized to initially calculate confidence score 580*d* and/or update confidence score 580*d* over time. Also, in some implementations confidence score 580*d* is calculated as needed by system 200. For example, by updating frequency data 580*c* and/or recency data 580*f* over time, confidence score 580*d* can be calculated to quantify a contemporary level of interest between user 562 and entity 568*a*.

Also, frequency data and/or recency data can be utilized to prune entities from the interest-level data. For example, if recency data 580*f* indicates that entity 568*a* is too old, interest-level data 566*a* may be removed from system 500. As one example, recency data 580*f* may be utilized to decrease confidence score 580*d* over time. This may be accomplished by comparing recency data 580*f* to a system clock to determine how much time has elapsed since entity 568*a* has been a topic of digital content that user 562 has interacted with, and proportionally decrease confidence score 580*d* as that time increases. When confidence score 580*d* falls below a predetermined threshold value, interest-level data 566*a* may be pruned from system 500. The foregoing is but one specific example of how frequency data and/or recency data can be utilized in system 500, and many other approaches are possible.

Method 300 additionally includes identifying (344 in FIG. 3) a candidate entity based on the candidate entity having one of the relationships to the entity within the knowledge base. For example, as indicated by FIG. 5, entity 568*b* is identified based on entity 568*b* having one of relationships 572 to entity 568*a* within knowledge base 524.

Figure 6:
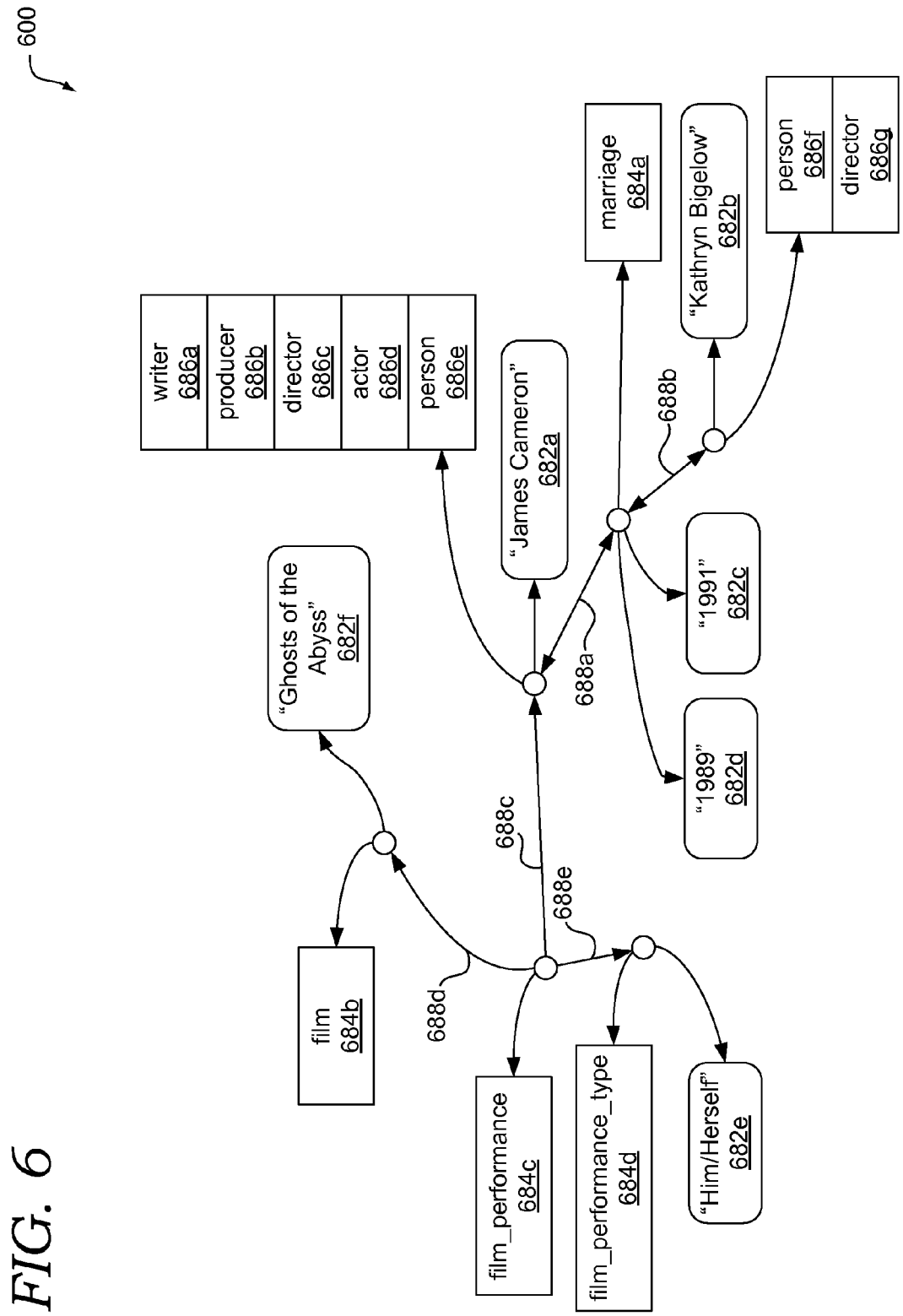
FIG. 6 depicts exemplary content of a knowledge base in accordance with implementations of the present disclosure.

An example of the foregoing is described below with respect to FIG. 6. FIG. 6 depicts exemplary content of a knowledge base in accordance with implementations of the present disclosure. In particular, the knowledge base can correspond to knowledge base 524 in FIG. 5. As shown in FIG. 6, knowledge base 600 includes a plurality of entities, which can correspond to entities 568 in FIG. 5. Not all of the plurality of entities in knowledge base 600 are shown in FIG. 6 for clarity of disclosure. It is noted that some of the entities not shown may be related to the entities shown.

Knowledge base 600 includes instance entities, such as instance entities 682*a*, 682*b*, 682*c*, 682*d*, 682*e*, and 682*f* (also referred to collectively herein as "instance entities 682"). Knowledge base 600 also includes concept entities, such as concept entities 684*a*, 684*b*, 684*c*, and 684*d* (also referred to collectively herein as "concept entities 684"). Knowledge base 600 includes attributes, which may be associated with the various entities, such as attributes 686*a*, 686*b*, 686*c*, 686*d*, 686*e*, 686*f*, and 686*g* (also referred to collectively herein as "attributes 686"). Attributes 686*a*, 686*b*, 686*c*, 686*d*, and 686*e* are of instance entity 682*a* and attributes 686*f* and 686*g* are of instance entity 682*b*. Knowledge base 600 also includes relations, which are utilized to indicate relationships between the plurality of entities. Relations shown include relations 688*a*, 688*b*, 688*c*, 688*d*, and 688*e* (also referred to collectively herein as "relations 688").

As described above, entity 568*b* can be identified based on entity 568*b* having one of relationships 572 to entity 568*a* within knowledge base 524. Each of relationships 572 can comprise one or more relations, for example, some of relationships 572 can comprise relations 688. In one example, entities 568*a* and 568*b* can each be instance entities of ontology 570. For example, entity 568*a* can be instance entity 682*a* in FIG. 6 and entity 568*b* can be instance entity 682*b* in FIG. 6. In the example shown in FIG. 6, instance entity 682*a* represents "James Cameron" and instance entity 682*b* represents "Kathryn Bigelow." At this point, instance entity 682*b* may not be explicitly associated with user 562 in system 500. For example, system 500 might not include interest-level data that links user 562 to instance entity 682*b*.

In accordance with some implementations, system 500 can identify instance entity 682*b* based on instance entity 682*b* having one or more relationships to instance entity 682*a* in knowledge base 600. In the example shown, relations 688*a* and 688*b* indicate a relationship between instance entity 682*a* and instance entity 682*b*. That relationship comprises instance entities 682*a* and 682*b* both being instance entities of concept entity 684*a*. In other words, instance entity 682*b* is sharing at least one common concept entity with instance entity 682*a*. In the present example, concept entity 684*a* represents marriage. Therefore, relations 668*a* and 668*b* indicate that "James Cameron" and "Kathryn Bigelow" have been married. As another example, instance entity 568*a* may represent the Seattle Mariners and instance entity 568*b* may represent the Houston Astros. A shared concept entity in knowledge base 524 may then be baseball.

Generally, entities 568*a* and 568*b* can either be a concept entity or an instance entity and both may be the same entity type. For example, entity 568*a* may be concept entity 684*a*

(e.g. marriage) in FIG. 6 or entity 568b may instead be concept entity 684a (e.g. marriage) in the above example. Although the present examples only reference entity 568a, which is a known entity by system 500 due to having interest-level data 566a, other known entities can be utilized in combination with entity 568a in order to identify entity 568b and/or other related entities in knowledge base 600. Those other known entities may have been derived from digital content in the same or a similar manner as entity 568a. As such, entity 568b may be identified based on having one or more relationships to some or all of the other known entiles in addition to entity 568a. In the example shown in FIG. 6, an example of those other known entities can be instance entities 682d (e.g. "1989") and 682c ("1991"), which define a range of time in which "James Cameron" and "Kathryn Bigelow" were married (i.e. 1989-1991).

It is further noted that multiple candidate entities can be identified. Various method of selecting from the multiple candidates may be used. For example, requiring a candidate entity to be related to multiple known entities can be utilized to narrow the number of candidate entities that are identified. To illustrate the forgoing, concept entity 684a (e.g. marriage) may be identified based on having relationships to each of instance entities 682a (e.g. "James Cameron"), 682b (e.g. "Kathryn Bigelow"), 682c (e.g. "1991"), and 682d (e.g. "1989"), which can be known entities. In contrast, instance entity 682f (e.g. "Ghosts of the Abyss") may not be identified, based on only being related to instance entity 682a (e.g. "James Cameron").

Thus, as described above, in accordance with various implementations, by analyzing knowledge base 524, system 500 can identify new entities that may be of interest to user 562, but did not necessarily appear as topics of digital content that user 562 has interacted with. As such, system 500 can generate and maintain robust user-interest profiles that more accurately and specifically capture the interests of user 562.

Method 300 also includes generating second interest-level data that quantifies a level of interest between the user and the candidate entity based on an analysis of the one of the relationships of the candidate entity to the entity within the knowledge base (346 in FIG. 3). For example, as indicated by FIG. 5, interest-level data 566b is generated and quantifies a level of interest between user 562 and entity 568b based on an analysis of the one of relationships 572 of entity 568b to entity 568a within knowledge base 524.

Examples are provided below whereby the second interest-level data can be generated and relationships between entities in knowledge base 524 can be analyzed. However, these examples are not intended to be limiting, and only illustrate possible approaches to generating the second interest-level data. Additionally, the examples given are simplified for clarity, but can be significantly more complex and incorporate additional variables. It is further noted that different approaches may be employed for knowledge bases havening different ontologies.

Returning to FIG. 6, where instance 682b was identified above, interest-level data 566b can be generated by analyzing the relationship of entities 568a to entity 568b within knowledge base 524. In doing so, system 500 may generate interest-level score 588 that quantifies a level of interest between user 562 and instance entity 682b. Furthermore, system 500 may generate interest-level data 566b based on the level of interest between user 562 and entity 568a as quantified by interest-level data 566a. As one example, interest-level score 588 may be calculated based on, for example, confidence score 580d.

Interest-level score 588 may correspond to confidence score 580d, decremented by a number of relations between instance entities 682b and 682a. For example, because only relations 688a and 688b link instance entities 682b and 682a in knowledge base 600, interest-level score 588 may still indicate a fairly strong interest. If instance entity 682b were more remote to instance entity 682a, interest-level score 588 may indicate a corresponding lower level of interest.

Interest-level score 588 can also be based on comparing attributes between instance entity 682b and instance entity 682a. For example, a comparison between attributes 686a and 686f may indicate that those attributes are the same or similar, which may increment interest-level score 588.

Other confidence scores and/or attributes of other entities related to instance entity 682b may also be factored into interest-level score 588. For example, interest-level score 588 may factor in and aggregate the other confidence scores. As one example, consider concept entity 684a as the identified entity being analyzed. Instance entities 682a and 682b may already be known to system 500 and have associated confidence scores. Those confidence scores may be factored into interest-level score 588, as well as the number of relations (i.e. degree of separation) between concept entity 684a and instance entities 682a and 682b.

If the level of interest indicated by interest-level score 588 is sufficiently strong, for example, if interest-level score 588 exceeds a predetermined threshold, or otherwise indicates strong interest, system 500 may generate interest-level data 566b. Interest-level data 566b may incorporate interest-level score 588 as a confidence score, similar to interest-level data 566a. In some implementations, the confidence score is calculated from or otherwise based on interest-level score 588. However, system 500 may determine that interest-level score 588 is not sufficiently strong whereby interest-level data 566b is not generated (e.g., if interest-level score 588 does not exceed the predetermined threshold).

Thus, system 500 may generate interest-level data 566b on a conditional basis in response to an analysis of relationships of instance entity 682b to instance entity 682a and/or other known entities in knowledge base 524. In this way, not all identified entities may become known to system 500. However, system 500 may still generate interest-level data 566b for instance entity 682b where interest-level score 588 does not indicate entity 682b as a strong interest to user 562. For example, system 500 may currently have insufficient interest-level data of entities 568 in order to determine a strong relationship between instance entity 682b and any other those various entities.

The interest-level data 566b may be generated by analyzing co-occurrence data. The co-occurrence data describes how often topics occur within a single document from a corpus of documents. The co-occurrence analysis may assign an interest level to a candidate entity that has not received user interaction by determining how often the candidate entity and an entity with a known interest level are both topics of a single document. The more often two entities occur together in a single document the stronger the relationship between the two entities can be. The stronger relationship can lead to higher level of interest-level assigned to the candidate entity. The result of the co-occurrence analysis may be recorded in a knowledge base as an indication of the relationship strength between entities.

In one aspect, the relationship strength between entities may be uni-directional. In other works the relation of A to B can be different than the relation of B to A. Uni-directional relationship strength can reflect how people form interests in related entities. For example, a person interested in a first entity may be interested in a second related entity with a first confidence and a person interested in the second entity may be interested in the first entity with a second confidence that is different than the first confidence. For example, a person interested in the Seattle Mariners (entity A) may be interested in Major League Baseball (entity 2) with a high confidence. On the other hand, a person with interest in Major League Baseball may be interested in the Seattle Mariners with a lower confidence because the Mariners are just 1 of 32 teams that may be of interest to a baseball fan.

In one aspect, the relational strength between entity A and entity B can be based on the total co-occurrence of entity A and B divided by the total occurrence of A within a corpus of analyzed documents. Similarly, the relational strength between entity B and A can be based on the total co-occurrence of entity A and B divided by the total occurrence of B within the corpus of analyzed documents.

The interest-level data 566b may be generated using a machine learning mechanism that evaluates entities and determines a confidence score that indicates how likely a person that is interested in a first entity is likely to be interested in a second entity. Training data, including user feedback, may be used to train the machine learning mechanism to evaluate a level of interest a user with a known in interest a first entity is likely to have in a second related entity. The training data can include editorial instructions or rules that adjust a relationship strength between two or more entities. For example, by rule a user may be assigned an interest in no more than two baseball teams. Baseball teams may have a great deal of co-occurrence in documents, but a user is not necessarily likely to be interested in multiple teams. However, the training data may show that users are typically interested in no more than two or three different teams. Given this data, the relationship strength between baseball teams may be discounted when attempting to assign interest levels to a user and one or more teams when the user has expressed an interest in a specific team.

As indicated above, the interest-level data of system 500 can change over time, for example, as user 562 views additional digital content and new inferences are generated in knowledge base 524. As such, a level of interest between user 562 and instance entity 682b can be reevaluated periodically. For example, the confidence score of interest-level data 566b may be updated so as to increase or decrease in value based on subsequent analysis of relationships between instance entity 682b and other entities in knowledge base 524. In this way, system 500 can form deep understandings about the interests of user 562 over time, which can adapt as more information from user 562 becomes available. Method 400 relates, in part, to some implementations of the present disclosure, which can be utilized to adapt the user interest-data of system 500 over time.

Figure 4:
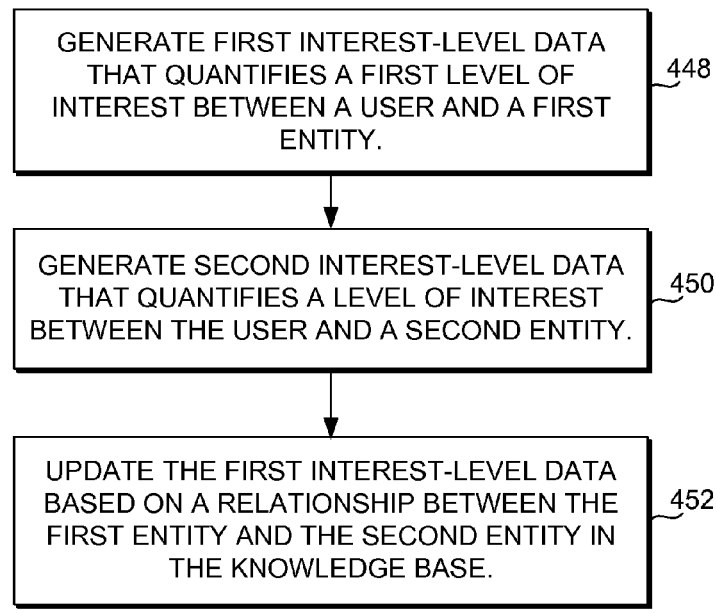
FIG. 4 depicts a flow diagram of an exemplary method for determining user interests in accordance with implementations of the present disclosure.

Referring now to FIG. 4, FIG. 4 depicts a flow diagram of an exemplary method in accordance with implementations of the present disclosure. In particular, FIG. 4 depicts a flow diagram of method 400, in accordance with implementations of the present disclosure. Method 400 is described below with respect to FIG. 5 and FIG. 6, for illustrative purposes only.

Method 400 includes generating first interest-level data that quantifies a first level of interest between a user and a first entity that is a topic of a first digital content, wherein the first entity is one of a plurality of entities included within a knowledge base, the knowledge base comprising an ontology that indicates relationships between the plurality of entities (448 in FIG. 4). For example, as indicated by FIG. 5, interest-level data 566a is generated and quantifies a level of interest between user 562 and entity 568a that is a topic of digital content 564a. Entity 568a is of entities 568 included within knowledge base 524, where knowledge base 524 comprises ontology 570 that indicates relationships 572 between entities 568.

Interest-level data 566a can be generated and quantify a level of interest between user 562 and entity 568a that is a topic of digital content 564a similar to what has been described above with respect to method 300. Thus, generating interest-level data 566a may be preceded by receiving user activity data 560 that describes an interaction between user 562 and digital content 564a.

Method 400 additionally includes generating second interest-level data that quantifies a second level of interest between the user and a second entity that is a topic of a second digital content, wherein the second entity is one of the plurality of entities included within the knowledge base (450 in FIG. 4). For example, as indicated by FIG. 5, interest-level data 566b is generated and quantifies a level of interest between user 562 and entity 568b that is a topic of digital content 564b. Entity 568b is of entities 568 included within knowledge base 524.

Interest-level data 566b can be generated and quantify a level of interest between user 562 and entity 568b that is a topic of digital content 564b similar to what has been described above with respect to method 300 and interest-level data 566a. Thus, generating interest-level data 566b may be preceded by receiving user activity data (not shown) that describes an interaction between user 562 and digital content 564b.

Method 400 also includes updating the first interest-level data by increasing the first level of interest between the user and the first entity based on the second entity being closely related to the first entity in one of the relationships of the knowledge base (452 in FIG. 4). For example, interest-level data 566a is updated by increasing the level of interest between user 562 and entity 568a based on entity 568b being closely related to entity 568a in one of relationships 572 of knowledge base 524.

Updating interest-level data 566a can include determining that entity 568b is closely related to entity 568a in one of relationships 572 of knowledge base 524, which may comprise counting a number of relations between entity 568a and 568b. In some implementations, entity 568b may be considered closely related to entity 568a if the number of relations does not exceed a predetermined threshold. Furthermore, the amount that the level of interest between user 562 and entity 568a is increased may be greater the more closely related entity 568b is to entity 568a. Updating interest-level data 566a can also incorporate other factors, such as confidence score 580d, and/or a confidence score of interest-level data 566b. Furthermore, similar factors can be considered with respect to other known entities of system 500 (i.e. entities having interest-level data).

As one example, updating interest-level data 566a may include generating interest-level score 588 for entity 568a. Confidence score 580d of interest-level data 566a can then be updated to interest-level score 588. Interest-level score 588 may be based on confidence score 580d of interest-level data 566a. For example interest-level score 588 may be calculated from confidence score 580d. However, interest-level score 588 is not necessarily based on confidence score 580d of interest-level data 566b.

By updating interest-level data 566a, method 400 enables system 500 to contemporize its understanding of user interests. Although the above example describes entities 568*a* and 568*b* as both being topics of digital content (i.e. digital content 564*a* and 564*b* respectively), in various implementations, either of entities 568*a* and 568*b* may have instead been candidate entities, having interest-level data generated in accordance with method 300. Additionally, interest-level data 566*a* can be updated based on other factors, such as updated frequency and/or recency data from digital content. While interest-level data 566*a* has been described as being updated, interest-level data 566*b* may also be updated based on an analysis of one of relationships 572 between entity 568*a* and 568*b* in knowledge base 524.

Utilizing methods in accordance with implementations of the present disclosure, system 500 can identify and determine levels of interest for new entities that may be of interest to user 562, but did not necessarily appear as topics of digital content that user 562 has interacted with. Furthermore, system 500 can identify and determine levels of interest for entities that did appear as topics of digital content that user 562 has interacted with. Additionally, system 500 can update the levels of interest for any of the entities over time.

The levels of interest are quantified by interest-level data, which can be utilized to identify and present digital content that is relevant to user 562. For example, in some implementations, additional digital content is presented to user 562 on user device 518 based on entity 568*a* or 568*b* being a topic of the additional digital content. The additional digital can be presented to user 562 without utilizing user activity data. For example, system 500 can determine whether entity 568*a* or 568*b* are topics of the additional digital content utilizing similar to means described above with respect to digital content 564*a*. In this way, system 500 can present user 562 with additional digital content that user 562 has not necessarily interacted with, but may be of interest to user 562.

Thus, for example, system 500 could know that user 562 is a fan of the Seattle Mariners (e.g. entity 568*a*) and present user 562 with a web article pertaining to the Seattle Mariners. It will be appreciated that various algorithms can be employed so as to determine which additional content should be presented to user 562 and at what time. For example, system 500 may present the additional content to user 562 based on determining that other users, such as users having similar interests as user 562, have interacted with the additional digital content. As another example, system 500 may present the additional content to user 562 based on how recently the additional content has become available. Thus, user 562 may be presented with a web article on the Seattle Mariners winning the World Series based on the timing and/or the popularity of the web article.

As another example, system 500 can generate search results for user 562 that are relevance ranked using any interest-level data therein. Thus, search results can be customized to a particular user. For example, a user may provide the search query "baseball tickets" to a search engine. System 500 may rank a web document about Seattle Mariners' tickets higher than a web document about Houston Astros' tickets based on user 562 being interested in the Seattle Mariners. However, an identical search query from a different user may rank a web document about Seattle Mariners' tickets lower than a web document about Houston Astros' tickets based on the different user being interested in the Houston Astros.

System 500 can also update the level of interest between user 562 and an entity based on feedback data from user 562. In the example above, for instance, user 562 choose to not interact with the web article that was presented as additional digital content. User 562 may close a window or otherwise generate user input which can constitute negative feedback data. Negative feedback data can be utilized to decrement the level of interest between user 562 and an entity. On the other hand, positive feedback data can be utilized to increment the level of interest between user 562 and an entity.

In some implementations, system 500 can present user 562 with a query based on analyzing interest-level data that is associated with an entity. User 562 may provide user input on user device 518 to respond to the query, where the user's response constitutes the feedback data. As one example, a digital assistant could present user 562 with the query "are you interested in the Seattle Mariners," where the Seattle Mariners is the entity. In this case, positive feedback may indicate a strong level of interest due to the directness of the query. As such, system 500 may store an indication that the entity is an explicit interest of user 562. Similarly, negative feedback may result in system 500 storing an indication that the entity is explicitly not an interest of user 562, or may result in pruning of stored interest-level data of the entity.

EXAMPLES

In one aspect, a computer-implemented method for determining user interests is provided. The method comprising: receiving user activity data that describes an interaction between a user and digital content; generating first interest-level data that quantifies a first level of interest between said user and an entity that is a topic of said digital content, wherein said entity is one of a plurality of entities included within a knowledge base, said knowledge base comprising an ontology that indicates relationships between said plurality of entities; identifying a candidate entity based on said candidate entity having one of said relationships to said entity within said knowledge base; and generating second interest-level data that quantifies a second level of interest between said user and said candidate entity based on an analysis of said one of said relationships of said candidate entity to said entity within said knowledge base.

In another aspect, a computer-implemented method for determining user interests is provided. The method comprising: generating first interest-level data that quantifies a first level of interest between a user and a first entity that is a topic of a first digital content, wherein said first entity is one of a plurality of entities included within a knowledge base, said knowledge base comprising an ontology that indicates relationships between said plurality of entities; generating second interest-level data that quantifies a second level of interest between said user and a second entity that is a topic of a second digital content, wherein said second entity is one of said plurality of entities included within said knowledge base; and updating said first interest-level data by increasing said first level of interest between said user and said first entity based on said second entity being closely related to said first entity in one of said relationships of said knowledge base.

In another aspect, one or more computer-storage media storing computer-useable instructions that, when executed by a computing device, perform a method for determining user interests are provided. The method comprising: identifying a digital content in user activity data that describes an interaction between a user and said digital content; identifying an entity that is matched to the digital content by mapping data, said entity being a topic of said digital content, wherein said entity is of a plurality of entities included within a knowledge base, said knowledge base comprising an ontology that indicates relationships between said plurality of entities; generating first interest-level data that quantifies a first level of interest between said user and said entity; identifying a candidate entity based on said candidate entity having one of said relationships to said entity within said knowledge base; and generating second interest-level data that quantifies a second level of interest between said user and said candidate entity based on an analysis of said one of said relationships of said candidate entity to said entity within said knowledge base.

Thus, in accordance with implementations of the present disclosure, user interests can be determined, discovered, and updated as facilitated by a knowledge base. The knowledge base can allow for deep understanding of digital content that a user has interacted with. Thus, new related interests can be discovered from the digital content that might otherwise have gone undiscovered. Furthermore, the user interests can be updated over time as more information is available about the user or user interests change. Also, additional digital content that is presented to the user can be customized to the user interests.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computer-implemented method for determining user interests, comprising:
   receiving user activity data that describes an interaction between a user and digital content;
   generating first interest-level data that represents a first level of interest between said user and a first entity and a second entity that are a topic of said digital content, wherein said first entity and said second entity are included within a knowledge base comprising a plurality of entities, said knowledge base comprising an ontology comprising a knowledge graph that indicates relationships between said plurality of entities;
   identifying a candidate entity based on said candidate entity having a relationship to both the first entity and the second entity within the knowledge base;
   generating second interest-level data that represents a second level of interest between said user and said candidate entity based on an analysis of said relationships between the candidate entry and the first entity and the second entity;
   linking a user ID associated with the user to the candidate entity, thereby indicating the user is interested in the candidate entity;
   receiving a search query from the user; and
   generating a search result comprising digital contents, in response to the received search query, wherein the digital contents are ranked using the generated first interest-level data and the generated second interest-level data.

2. The computer-implemented method of claim 1, wherein said first entity and said candidate entity are each instance entities of said ontology.

3. The computer-implemented method of claim 1, wherein said interaction between said user and said digital content involves a web browser;
   further, indicating a point in time when said first entity appeared as said topic in said digital content that said user interacted with; and pruning said first entity from said first interest level data after more than a threshold amount of time passes between the point in time and a present time.

4. The computer-implemented method of claim 1, wherein said candidate entity is not a topic of digital content the user has interacted with, and wherein the candidate entry is related to the first entity through co-occurrence in one or more documents.

5. The computer-implemented method of claim 1, further comprising updating said first level of interest between said user and said first entity or second entity based on a frequency of said first entity or second entity being a topic of additional digital content that the user interacts with.

6. The computer-implemented method of claim 1, further comprising updating said first level of interest between said user and said first entity or second entity that is said topic of said digital content based on a recency of said first entity or second entity being a topic of digital content.

7. The computer-implemented method of claim 1, further comprising presenting additional digital content to said user on a user device based on said candidate entity being a topic of said additional digital content.

8. The computer-implemented method of claim 1, further comprising generating search results for said user that are relevance ranked using said second interest data.

9. The computer-implemented method of claim 1, further comprising exposing said second interest-level data for consumption by multiple applications.

10. The computer-implemented method of claim 1, further comprising presenting said candidate entity to said user on a user device based on said second interest-level data; and updating said second interest level between said user and said candidate entity based on feedback received from said user.

11. One or more computer-storage media storing computer-useable instructions that, when executed by a computing device, perform a method for determining user interests, comprising:
   identifying a digital content in user activity data that describes an interaction between a user and said digital content;
   identifying a first entity and a second entity that are matched to the digital content by mapping data, said first entity and said second entity being a topic of said digital content, wherein said first entity and said second entity are included within a knowledge base comprising a plurality of entities, said knowledge base comprising an ontology comprising a knowledge graph that indicates relationships between said plurality of entities;
   generating first interest-level data that represents a first level of interest between said user and said first entity and said second entity;
   identifying a candidate entity based on said candidate entity having a relationship to both the first entity and the second entity within the knowledge base;
   generating second interest-level data that represents a second level of interest between said user and said candidate entity based on an analysis of said relationship;
   linking a user ID associated with the user to the candidate entity, thereby indicating the user is interested in the candidate entity;
   receiving a search query from the user; and
   generating a search result comprising digital contents, in response to the received search query, wherein the digital contents are ranked using the generated first interest-level data and the generated second interest-level data.

12. The one or more computer-storage media of claim 11, wherein said mapping data is of a plurality of mapping data in an index, said plurality of mapping data matching ones of said plurality of entities included within said knowledge base to corresponding digital content.

13. The one or more computer-storage media of claim 11, wherein said first entity and said second entity and said candidate entity are each instance entities of said ontology.

14. The one or more computer-storage media of claim 11, further comprising determining said first entity and said second entity as said topic of said digital content based on an analysis of said digital content.

15. The one or more computer-storage media of claim 11, wherein said one of said relationships comprises one or more relations of said ontology of said knowledge base.

16. A computer-implemented system for determining user interests, comprising:
one or more processors;
one or more computer storage media storing computer-useable instructions that, when executed by the one or more processors, cause the one or more processors to perform operations comprising:
receiving user activity data that describes an interaction between a user and digital content;
identifying a first entity and a second entity that are matched to the digital content by mapping data, said first entity and said second entity being a topic of said digital content, wherein said first entity and said second entity are included within a knowledge base comprising a plurality of entities, said knowledge base comprising an ontology comprising a knowledge graph that indicates relationships between said plurality of entities;
identifying a candidate entity based on said candidate entity having a relationship to both the first entity and the second entity within the knowledge base;
generating second interest-level data that represents a second level of interest between said user and said candidate entity based on an analysis of said relationship, said analysis comprising comparing one or more attributes of said ontology assigned to said first entity and said second entity in said ontology to one or more attributes of said ontology assigned to said candidate entity in said ontology;
linking a user ID associated with the user to the candidate entity, thereby indicating the user is interested in the candidate entity;
receiving a search query from the user; and
generating a search result comprising digital contents, in response to the received search query, wherein the digital contents are ranked using the generated first interest-level data and the generated second interest-level data.

17. A computer-implemented system of claim 16, wherein said generating of said second interest-level data is independent of whether said candidate entity has been identified as a topic of any digital content said user has interacted with.

18. A computer-implemented system of claim 16, wherein said generating of said second interest-level data comprises analyzing co-occurrence data that corresponds to how often said candidate entity and said first entity and said second entity both occur as topics within a single document amongst a corpus of documents, independent of whether said candidate entity has been identified as a topic of any digital content said user has interacted with.

19. A computer-implemented system of claim 16, wherein said generating said second interest-level data is based on determining a similarity between said one or more attributes of said first entity and said second entity and said one or more attributes of said candidate entity.

20. A computer-implemented system of claim 16, wherein said one or more attributes of said first entity and said second entity and said one or more attributes of said candidate entity are each keywords.

* * * * *